United States Patent
Edmiston

(10) Patent No.: US 9,612,881 B2
(45) Date of Patent: Apr. 4, 2017

(54) METHOD, APPARATUS, AND SYSTEM FOR UNAMBIGUOUS PARAMETER SAMPLING IN A HETEROGENEOUS MULTI-CORE OR MULTI-THREADED PROCESSOR ENVIRONMENT

(71) Applicant: Graham Edmiston, Bridge of Weir (GB)

(72) Inventor: Graham Edmiston, Bridge of Weir (GB)

(73) Assignee: NXP USA, Inc., Austin, TX (US)

( * ) Notice: Subject to any disclaimer, the term of this patent is extended or adjusted under 35 U.S.C. 154(b) by 4 days.

(21) Appl. No.: 14/672,596

(22) Filed: Mar. 30, 2015

(65) Prior Publication Data

US 2016/0292014 A1  Oct. 6, 2016

(51) Int. Cl.
*G06F 9/52* (2006.01)
*G06F 9/48* (2006.01)
*G06F 11/34* (2006.01)

(52) U.S. Cl.
CPC .............. *G06F 9/52* (2013.01); *G06F 9/4843* (2013.01); *G06F 11/3409* (2013.01); *G06F 11/3466* (2013.01); *G06F 2201/86* (2013.01); *G06F 2201/88* (2013.01); *G06F 2201/885* (2013.01)

(58) Field of Classification Search
None
See application file for complete search history.

(56) References Cited

U.S. PATENT DOCUMENTS

| | | |
|---|---|---|
| 5,493,673 A | 2/1996 | Rindos, III et al. |
| 5,796,939 A | 8/1998 | Berc et al. |
| 6,112,317 A | 8/2000 | Berc et al. |
| 6,728,949 B1 * | 4/2004 | Bryant ............... G06F 11/3409 712/233 |
| 6,925,424 B2 | 8/2005 | Jones et al. |
| 7,221,655 B2 | 5/2007 | Luk |
| 7,979,252 B2 | 7/2011 | Horvitz et al. |
| 8,045,662 B2 | 10/2011 | Zhuang et al. |
| 8,065,647 B2 * | 11/2011 | Stevens ............... G06F 17/5059 716/100 |
| 8,136,124 B2 | 3/2012 | Kosche et al. |
| 8,176,351 B2 | 5/2012 | Castro et al. |

(Continued)

OTHER PUBLICATIONS

Cook et al, Proving Thread Termination, 2007, ACM, PLDI'07, pp. 320-330.*

(Continued)

*Primary Examiner* — Abu Ghaffari

(57) ABSTRACT

Apparatuses, methods, and systems are configured to perform unambiguous parameter sampling in a heterogeneous multi-core or multi-threaded environment by masking one or more thread requests; and, in response to bus activity ceasing for the one or more masked thread requests and completing any routine being processed for the one or more masked threads, processing a command by executing at least one of a command routine or a command thread, wherein the command routine or the command thread reads the parameter using thread atomicity with deterministic synchronization. One or more thread requests may be selected for masking by monitoring thread activity for each of a plurality of threads.

20 Claims, 18 Drawing Sheets

(56) References Cited

U.S. PATENT DOCUMENTS

| | | | |
|---|---|---|---|
| 8,276,142 B2 | 9/2012 | Alameldeen et al. | |
| 8,286,139 B2 | 10/2012 | Jones et al. | |
| 8,621,464 B2 | 12/2013 | Dawson et al. | |
| 8,762,951 B1* | 6/2014 | Kosche | G06F 11/3476 717/127 |
| 8,826,241 B2 | 9/2014 | Wolczko et al. | |
| 8,839,271 B2 | 9/2014 | Jones et al. | |
| 8,843,684 B2 | 9/2014 | Jones et al. | |
| 9,231,858 B1* | 1/2016 | Greifeneder | H04L 45/24 |
| 9,262,235 B2* | 2/2016 | Tillier | G06F 9/526 |
| 2005/0251639 A1* | 11/2005 | Vishin | G06F 13/1642 711/168 |
| 2010/0125717 A1* | 5/2010 | Navon | G06F 9/3851 712/30 |
| 2011/0283262 A1* | 11/2011 | Ceze | G06F 9/467 717/128 |
| 2012/0290718 A1* | 11/2012 | Nethercutt | G06F 11/3006 709/224 |
| 2013/0097384 A1 | 4/2013 | Suzuki et al. | |
| 2014/0115374 A1* | 4/2014 | Iyer | G06F 1/12 713/400 |
| 2014/0215162 A1 | 7/2014 | Steeley, Jr. et al. | |
| 2014/0344831 A1* | 11/2014 | Levine | G06F 9/52 718/107 |
| 2015/0054836 A1 | 2/2015 | Bolz et al. | |
| 2015/0074668 A1 | 3/2015 | Burka et al. | |
| 2015/0143343 A1* | 5/2015 | Weiss | G06F 11/3668 717/128 |

OTHER PUBLICATIONS

Malkowski et al, Challenges and Opportunities in Consolidation at High Resource Utilization: Non-monotonic Response Time Variations in n-Tier Applications, 2012, IEEE, Fifth International Conference on Cloud Computing, pp. 162-169.*

* cited by examiner

US 9,612,881 B2

METHOD, APPARATUS, AND SYSTEM FOR UNAMBIGUOUS PARAMETER SAMPLING IN A HETEROGENEOUS MULTI-CORE OR MULTI-THREADED PROCESSOR ENVIRONMENT

CROSS-REFERENCE TO RELATED APPLICATIONS

—

STATEMENT REGARDING FEDERALLY SPONSORED RESEARCH OR DEVELOPMENT

—

FIELD OF THE DISCLOSURE

The present disclosure relates to computer processors and, more particularly, to methods, apparatuses, and systems for performing unambiguous counter and state sampling in a heterogeneous multi-core or multi-threaded processor environment.

BACKGROUND OF THE DISCLOSURE

Existing redundancy schemes may utilize two or more transmitters each configured to transmit the same data. From time to time, it may be necessary to obtain one or more updatable parameters, such as a sampled count or a sampled state, for each of the transmitters. However, sampling the counters and states for each of the transmitters is problematic in terms of synchronization. If each of a respective plurality of transmitters is configured with its own corresponding thread that runs on a processor core that is programmed to control the transmission of data and run a protocol state machine, then a general-purpose central processing unit (CPU) reading of the counters and states on each transmitter may not yield an accurate snapshot of the counters and states. Multiple threads or CPUs do not always obtain the same value when reading a counter or state. This undesired outcome is caused by bus latencies as well as utilization of separate read cycles. Essentially, the CPU must perform a plurality of temporally dislocated read operations. Moreover, if the counter or state is being reset after the read, the period between the read and the write to reset can result in information being lost. If the redundancy scheme is reliant on, or if its implementation is simplified by, obtaining samples for the counts and states unambiguously, then it may be difficult or impossible to achieve deterministic synchronization among the two or more transmitters.

Cache algorithms and features have been proposed to provide deterministic synchronization and coherency in multiple-transmitter systems where temporally dislocated multiple read operations need to be performed. These cache-based approaches focus on addresses and cache line concurrency. However, cache-based approaches are geared toward homogeneous core complexes, and complex hardware is therefore required for coherent sampling and clearing of counters and states in heterogeneous systems. A heterogeneous system may include, for example, a core complex interfacing to offload hardware with embedded proprietary or heterogeneous cores that may not have data cache hardware.

For at least these reasons, therefore, it would be advantageous if new or improved systems and methods for performing unambiguous counter and state sampling in a heterogeneous multi-core or multi-threaded environment could be achieved that address one or more of the previously-discussed limitations or other limitations.

DETAILED DESCRIPTION

Figure 1:
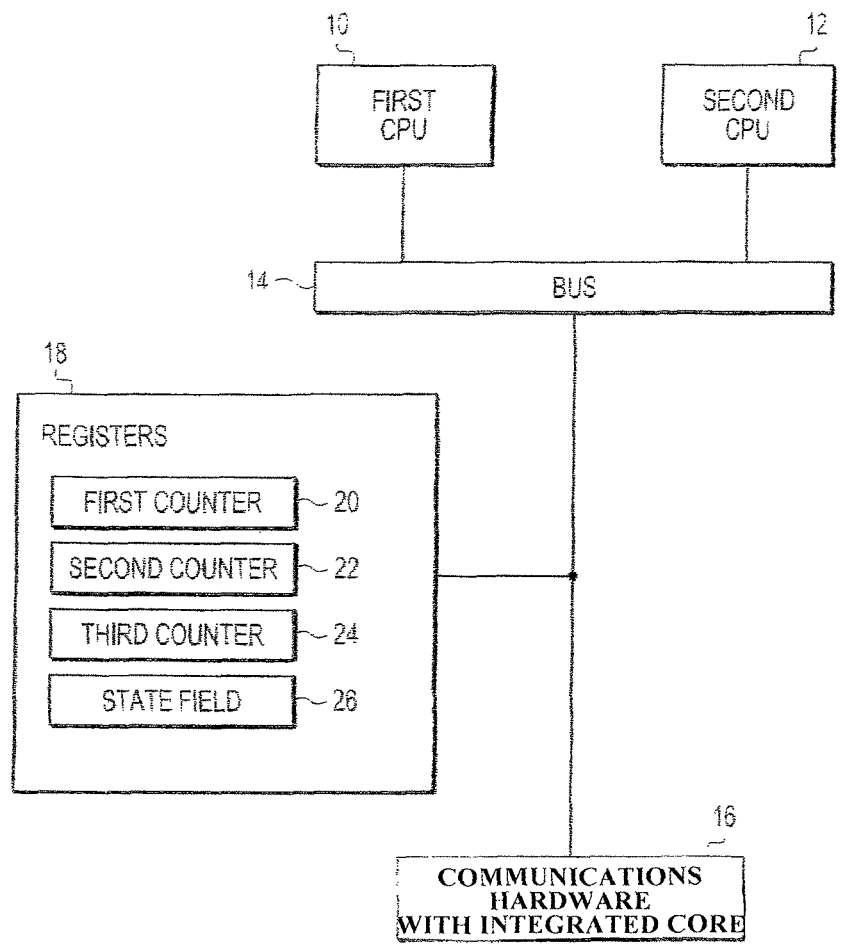
FIG. 1 is a hardware block diagram showing an exemplary heterogeneous multi-threaded processor environment.

Apparatuses, methods, and systems are configured to perform unambiguous parameter sampling in a multi-core or multi-threaded environment. In response to monitoring thread activity for each of a plurality of threads, one or more thread requests are selected and masked. In response to bus activity ceasing for the one or more masked thread requests, and in response to completing any routine being processed for the one or more masked threads, a command routine or a command thread is executed. The command routine or the command thread reads the parameter unambiguously to provide thread atomicity with deterministic synchronization.

In the field of computer programming, a thread is defined as placeholder information associated with a single use of a program that can handle multiple concurrent users. From the program's point of view, a thread is the information needed to serve one individual user or a particular service request. If multiple users are using the program, or if concurrent requests from other programs occur, a thread is created and maintained for each of these users or other programs. The thread allows a program to know which user is being served as the program alternately gets re-entered on behalf of different users. Thread information may be kept by storing it in a special data area and putting the address of that data area in a register. An operating system may save the contents of the register when the program is interrupted, and then restore the contents of the register when the operating system gives the program control again.

The term "thread" is sometimes confused with the concept of a "task." Threads and tasks are similar but not identical. Most computers can only execute one program instruction at a time, but because they are configured to operate at fast speeds, they appear to run many programs and serve many users simultaneously. The computer operating system gives each program a "turn" at running, then requires the program to wait while another program gets a turn. Each of these programs is viewed by the operating system as a task for which certain resources are identified and tracked.

The operating system manages each application program in a typical personal computer (PC) system, such as a spreadsheet program, a word processor program, and an Internet browsing program, as separate tasks and allows a user to look at and control a plurality of items on a task list. If one of these application programs initiates an I/O request, such as reading a file or writing to a printer, the operating system creates a thread. Data kept as part of this thread allows the operating system to reenter the program at the right place when the I/O operation completes. Meanwhile, other concurrent uses of the program are maintained on other threads. Most operating systems provide support for both multitasking and multithreading. These operating systems also allow multithreading within program processes so that the operating system is saved the overhead of creating a new process for each thread.

In the field of computer science, the term "masking" refers to AND'ing or OR'ing a first bit pattern that may be referred to as an operand, with a second bit pattern that may be referred to as a mask, to select zero or more bits from the first bit pattern. Using a mask, one or more bits in a byte, nibble, or word can be set to "on" or set to "off" by means of single bitwise operations. Masks may be used in conjunction with thread requests to differentiate between thread requests that should be executed, versus thread requests that should be ignored or blocked. An affinity mask is a specific type of bit mask that identifies the processor or processors that a thread or process should be executed on by the scheduler of an operating system.

Embodiments of apparatuses, methods, and systems described herein are configured to perform unambiguous parameter sampling in a heterogeneous multi-core or multi-threaded environment. In at least some such apparatuses, methods, and systems that are described herein, unambiguous parameter sampling is provided by issuing a command; masking one or more thread requests; and, in response to bus activity ceasing for the one or more masked thread requests and completing any routine being processed for the one or more masked threads, processing the command by executing at least one of a command routine or a command thread, wherein the command routine or the command thread reads the parameter. One or more thread requests may be selected for masking by continuously, periodically, or repeatedly monitoring thread activity for each of a plurality of threads.

According to a set of further embodiments that are disclosed herein, the parameter includes at least one counter, or at least one state, or any combination of counters and states. The command may be used to mask a plurality of threads. The command may be configured to read multiple states, multiple counters, and other parameters synchronously, thereby providing an application with an accurate unambiguous snapshot of a processing environment that may or may not be temporally and/or physically dislocated from the command issuer.

Figure 2:
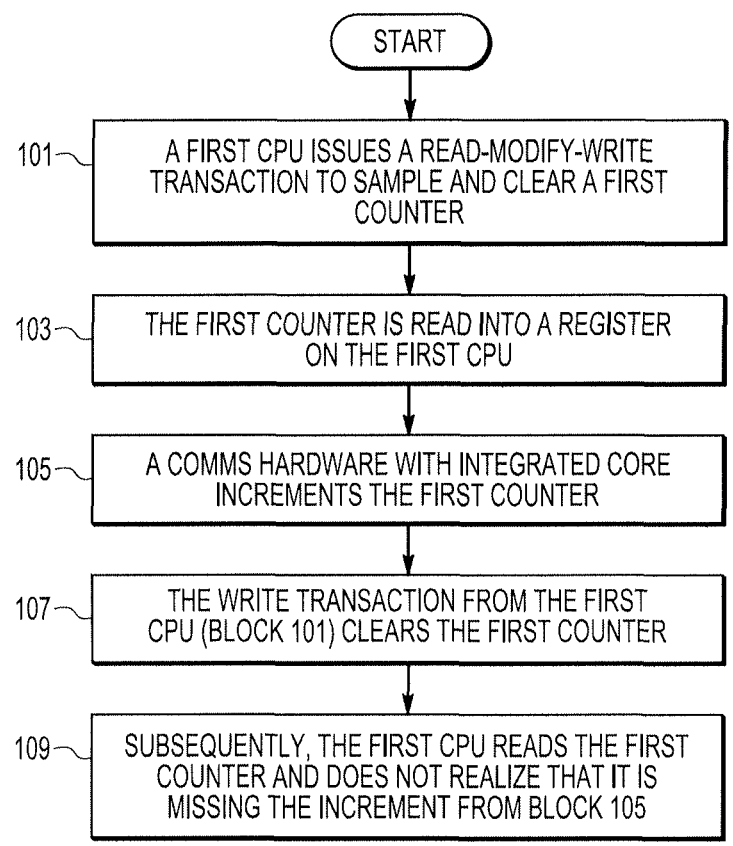
FIG. 2 is a flowchart showing a first prior art procedure which may provide ambiguous counter sampling when executed in the heterogeneous multi-threaded processor environment of FIG. 1.

FIG. 1 is a hardware block diagram showing an exemplary heterogeneous multi-threaded processor environment, and FIG. 2 is a flowchart showing a first prior art procedure which may provide ambiguous counter sampling when executed in the heterogeneous multi-threaded processor environment of FIG. 1. The operational sequence of FIG. 2 commences at block 101 where a first central processing unit (CPU) 10 (FIG. 1) issues a read-modify-write transaction to sample a first counter 20 and clear the first counter 20. Next, at block 103 (FIG. 2), the first counter 20 (FIG. 1) is read into a register on the first CPU 10. At block 105 (FIG. 2), a communications (comms) hardware with integrated core 16 (FIG. 1) increments the first counter 20. The write transaction from the first CPU 10 clears the first counter 20 at block 107 (FIG. 2). Subsequently, at block 109, the first CPU 10 (FIG. 1) reads the first counter 20 and does not realize that the first counter 20 is missing the increment from block 105 (FIG. 2).

Figure 3:
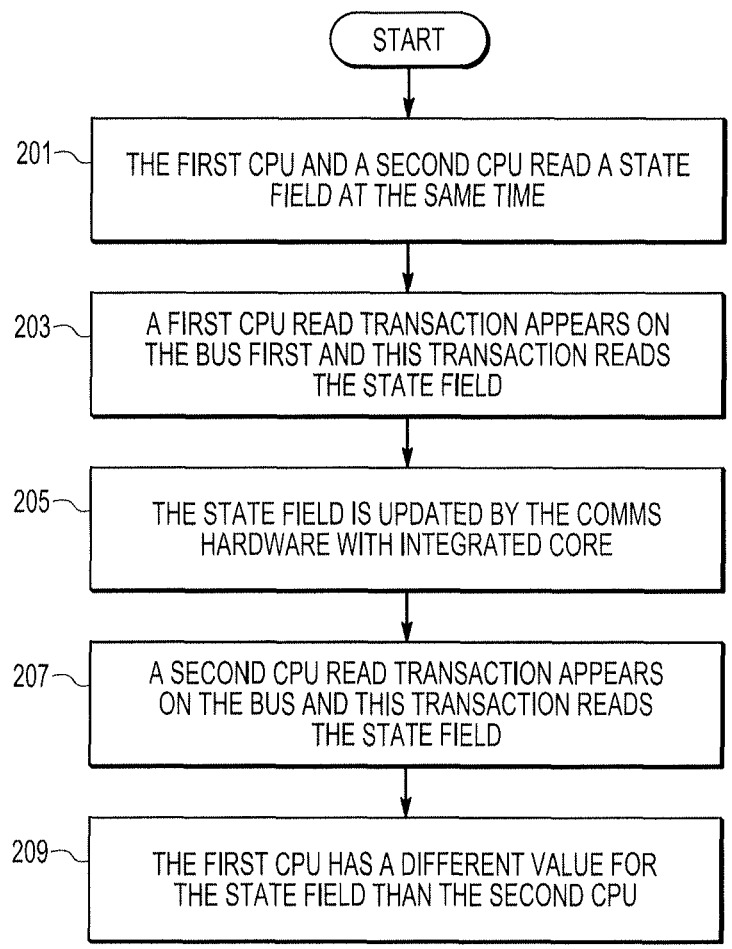
FIG. 3 is a flowchart showing a second prior art procedure which may provide ambiguous state field sampling when executed in the heterogeneous multi-threaded processor environment of FIG. 1.

FIG. 3 is a flowchart showing a second prior art procedure which may provide ambiguous state field sampling when executed in the heterogeneous multi-threaded processor environment of FIG. 1. The operational sequence of FIG. 3 commences at block 201 where the first CPU 10 (FIG. 1) and a second CPU 12 read a state field 26 at the same time. At block 203 (FIG. 3), a first CPU 10 (FIG. 1) read transaction appears on a bus 14 first (i.e., prior to a second CPU read transaction). This first transaction reads the state field 26. The state field 26 is updated by the comms hardware with integrated core 16 at block 205 (FIG. 3). Next, at block 207, a second CPU 12 (FIG. 1) read transaction appears on the bus 14, and this transaction reads the state field 26. Thus, the first CPU 10 has a different value for the state field 26 compared to the second CPU 12 at block 209 (FIG. 3).

Figure 4:
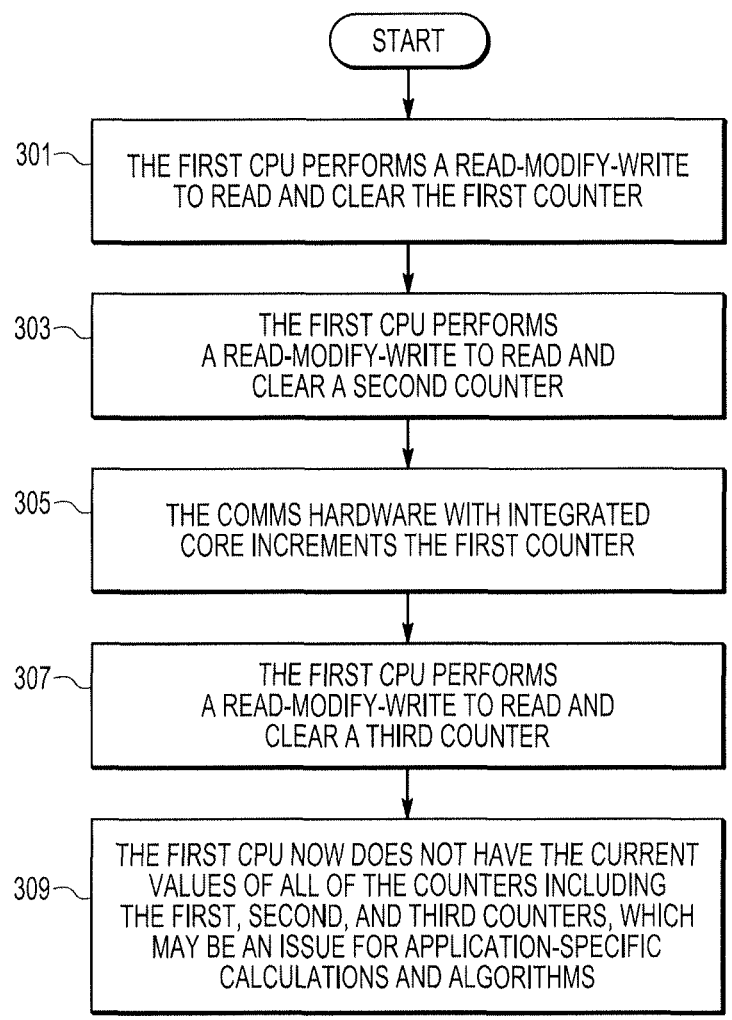
FIG. 4 is a flowchart showing a third prior art procedure which may provide ambiguous counter sampling for a first counter, a second counter, and a third counter when executed in the heterogeneous multi-threaded processor environment of FIG. 1.

FIG. 4 is a flowchart showing a third prior art procedure which may provide ambiguous counter sampling for the first counter 20 (FIG. 1), the second counter 22, and the third counter 24 when executed in the heterogeneous multi-threaded processor environment of FIG. 1. The operational sequence of FIG. 4 commences at block 301 where the first CPU 10 (FIG. 1) performs a read-modify-write operation to read and clear the first counter 20. Next, at block 303 (FIG. 4), the first CPU 10 (FIG. 1) performs a read-modify-write operation to read and clear a second counter 22. The comms hardware with integrated core 16 increments the first counter 20 at block 305 (FIG. 4). The first CPU 10 (FIG. 1) then performs a read-modify-write operation (FIG. 4, block 307) to read and clear a third counter 24 (FIG. 1). Thus, at block 309 (FIG. 4), the first CPU 10 (FIG. 1) does not have the current value of all the counters including the first counter 20, the second counter 22, and the third counter 24, which may cause problems and inaccurate results in the context of application-specific calculations and algorithms. A mechanism is needed that synchronously reads all of the counters including the first counter 20, the second counter 22, and the third counter 24.

Figure 5:
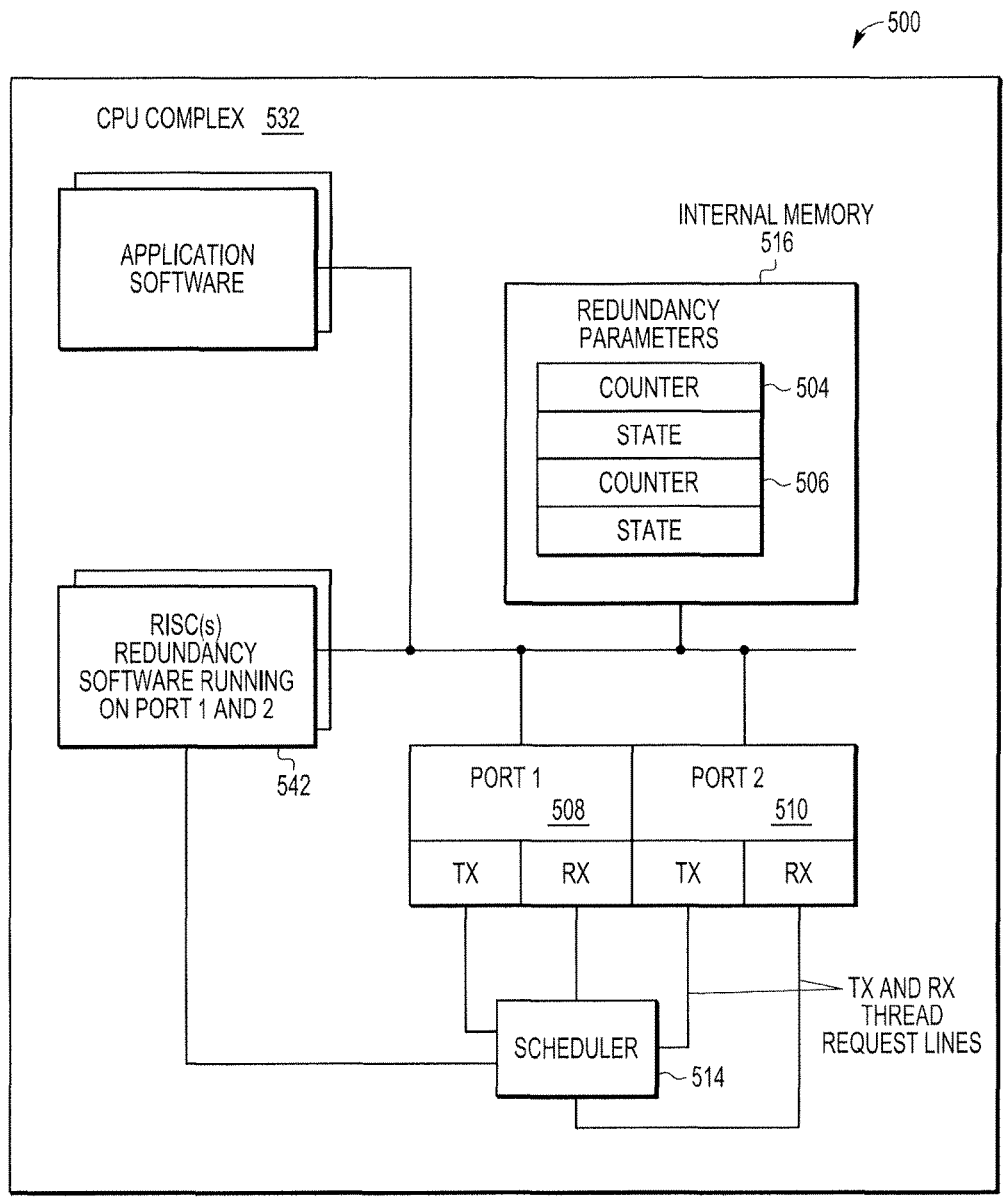
FIG. 5 is a hardware block diagram showing a prior art complex state machine which may not provide deterministic synchronization when a read-modify-write operation from a CPU to a counter is performed.

FIG. 5 is a hardware block diagram showing a prior art complex state machine 500 which may not provide deterministic synchronization when a read-modify-write operation from a CPU complex 532 to one or more counters 504, 506 is performed. The CPU complex 532 comprises one or more CPUs and is configured to interface with one or more ports such as Port 1 508 and Port 2 510. Port 1 508 and Port 2 510 each have two active threads as follows: a first thread is for Port 1 508 Transmit (Tx), a second thread is for Port 1 508 Receive (Rx), a third thread is for Port 2 510 Tx, and a fourth thread is for Port 2 510 Rx. A plurality of Reduced Instruction Set Computers (RISCs) 542 are running a redundancy protocol over Port 1 508 and Port 2 510. The port threads, including the first, second, third, and fourth threads, request service from the RISCs 542 via a scheduler 514. The scheduler 514 may be implemented using hardware, software, or firmware, or any combination of hardware, software, and firmware. A software implementation may, but need not, be used in connection with Linux. The scheduler 514 holds state information for each of the first, second, third, and fourth threads' hardware. The scheduler 514 uses this state information to decide if a request can be serviced, and which thread to activate on the RISCs 542. The RISCs 542 run the redundancy protocol and update various parameters coherently inside the redundancy parameters in an internal memory 516. As multiple threads are active concurrently due to the multiple RISCs 542, a read-modify-write operation from the CPU complex 532 to the counters 504, 506 is problematic to synchronize.

Figure 6:
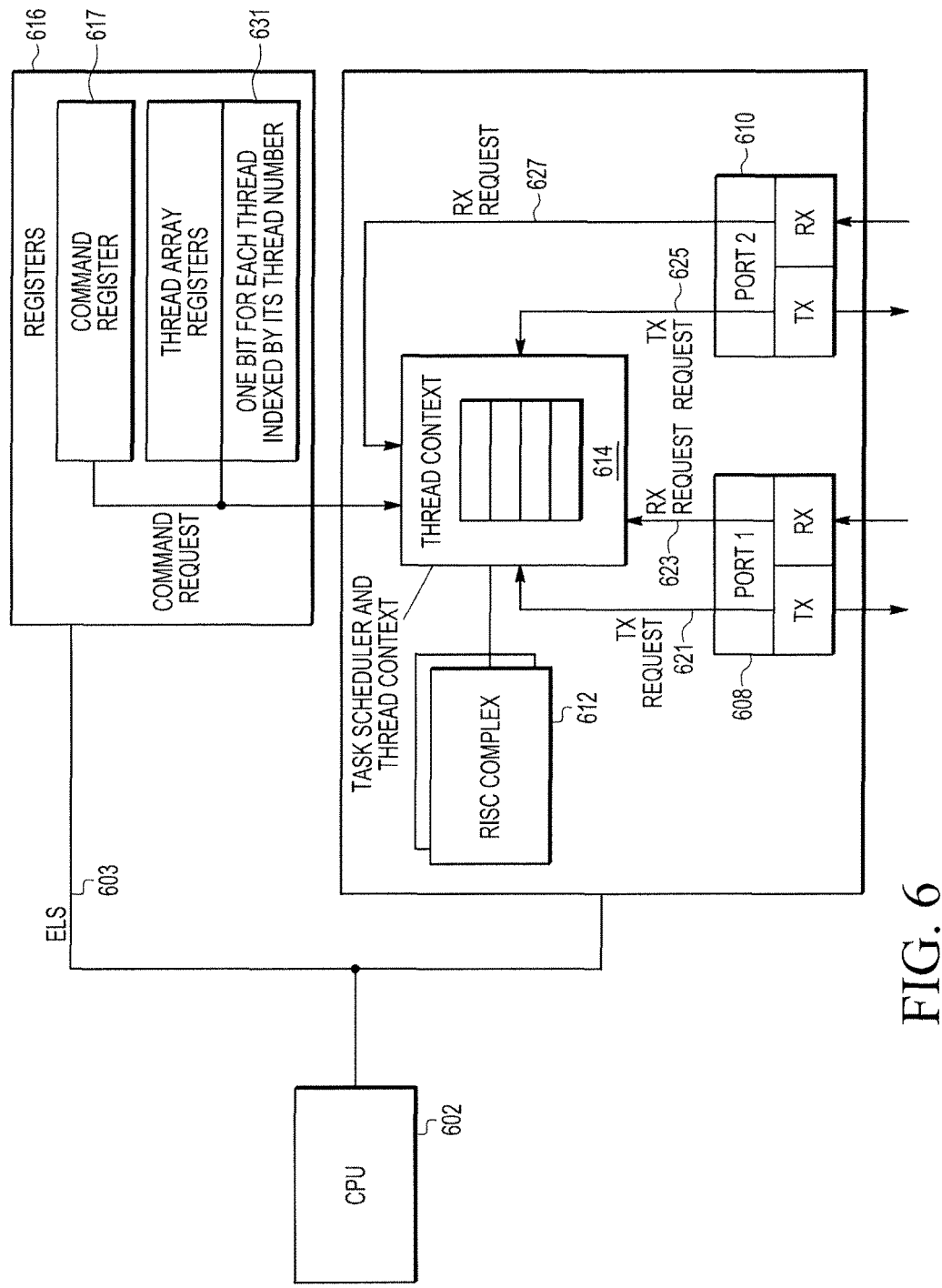
FIG. 6 is a hardware block diagram showing an illustrative complex task scheduler configured according to a set of exemplary embodiments for obtaining and processing counter values, state fields, and other parameters using thread atomicity with deterministic synchronization to provide synchronous, atomic and lossless operations.
Figure 7:
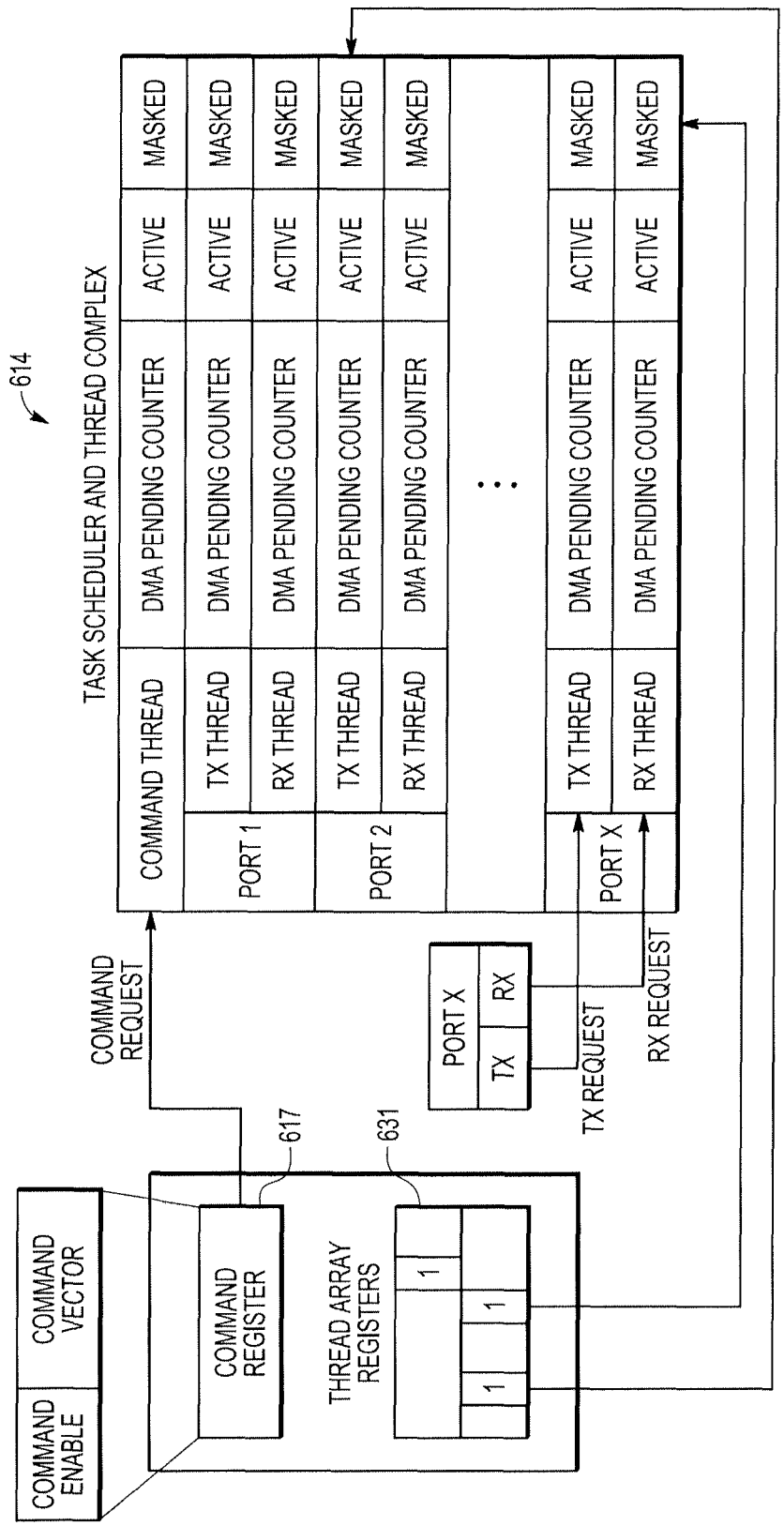
FIG. 7 is a data structure diagram showing illustrative data flows for the task scheduler of FIG. 6.

FIG. 6 is a hardware block diagram showing an illustrative complex task scheduler 614 configured according to a set of exemplary embodiments for obtaining and processing counter values, state fields, and other parameters using thread atomicity with deterministic synchronization to provide synchronous, atomic and lossless operations. FIG. 7 is a data structure diagram showing illustrative data flows for the task scheduler 614 of FIG. 6.

As used herein, the term "lossless" refers to operations that are implemented without any data being lost or discarded. The term "synchronous" refers to read and write operations that are deterministically operable, so as to provide an unambiguous sample of parameters such as counters and state indicators. Alternatively or additionally, the term "synchronous" refers to single-threaded blocking, occurring in the same thread as other computations, thereby preventing those computations from resuming until the communication is complete. Synchronous processes in separate, networked devices may depend on a common clocking source, on clocking pulses emitted by a transmitting device, or on synchronizing bits or bit patterns embedded in a set of data. An illustrative example of a set of synchronous operations may utilize a first time interval that elapses between transmission of A and transmission of B. A second time interval elapses between transmission of B and transmission of C, wherein the first and second time intervals are substantially identical. Another example of a synchronous operation is completing a current operation before a next operation is started.

In computer programming, the term "atomic" describes a unitary action or object that is essentially indivisible, unchangeable, whole, and irreducible. For example, in Structured Query Language (SQL), an atomic function is one that will either complete or return to its original state if a power interruption or an abnormal end occurs. The term "thread atomicity" refers to a thread or plurality of threads for which no change can take place during the time between the setting of a mask and the receiving of a signal to change the mask.

Referring now to FIG. 6, a CPU 602 is operatively coupled to a plurality of registers 616 and the scheduler 614 over a bus 603. The scheduler 614 may be implemented using hardware, software, or firmware, or any combination of hardware, software, and firmware. A software implementation may, but need not, be used in connection with Linux. The plurality of registers 616 includes a command register 617 (FIGS. 6 and 7) and a set of thread array registers 631. The scheduler 614 is configured to interface with one or more ports such as Port 1 608 and Port 2 610 (FIG. 6). Port 1 608 and Port 2 610 each have two active threads as follows: a first thread is for Port 1 608 transmit (Tx), a second thread is for Port 1 608 receive (Rx), a third thread is for Port 2 610 Tx, and a fourth thread is for Port 2 610 Rx. A plurality of RISC processors comprised in a RISC complex 612 are running a protocol over Port 1 608 and Port 2 610. This protocol may, but need not, be a redundancy protocol. The port threads, including the first, second, third, and fourth threads, request service from the RISC complex 612 via the scheduler 614. The scheduler 614 holds state information for each of the first, second, third, and fourth threads' hardware. The scheduler 614 uses this state information to decide if a request may be serviced, and which thread to activate on the RISC complex 612.

The scheduler 614 (FIGS. 6 and 7) provides deterministic synchronization by obtaining counter values, state fields, and other parameters using thread atomicity with deterministic synchronization to provide synchronous, atomic and lossless operations. This functionality is provided by the scheduler 614 which will not issue a command programmed in the command register 617 to the RISC Complex 612 in any of the following situations:

(a) Command enable=0

(b) Command enable=1, Masked=1 and Direct Memory Access (DMA) Pending Counter>0

(c) Command enable=1, Masked=1 and Active=1.

The scheduler 614 is configured to not invoke a thread in any of the following situations:

(a) A request line 621, 623, 625, or 627 for the thread is inactive (b) Direct Memory Access (DMA) Pending Counter>0

(c) Active=1

(d) Command enable=1 and Masked=1

Basically, when a command enable bit is set, the scheduler 614 (FIGS. 6 and 7) waits for all bus 603 (FIG. 6) activity (DMAs) and RISC complex 612 activity to complete on threads that have their corresponding bit(s) set in the thread array registers 631. After this, the command thread can be activated allowing synchronous, atomic and lossless operations. The clearing of the command enable by the RISC Complex 612 at the end of the command signals to the scheduler 615 to ignore the thread array registers 631 masking.

Figure 8:
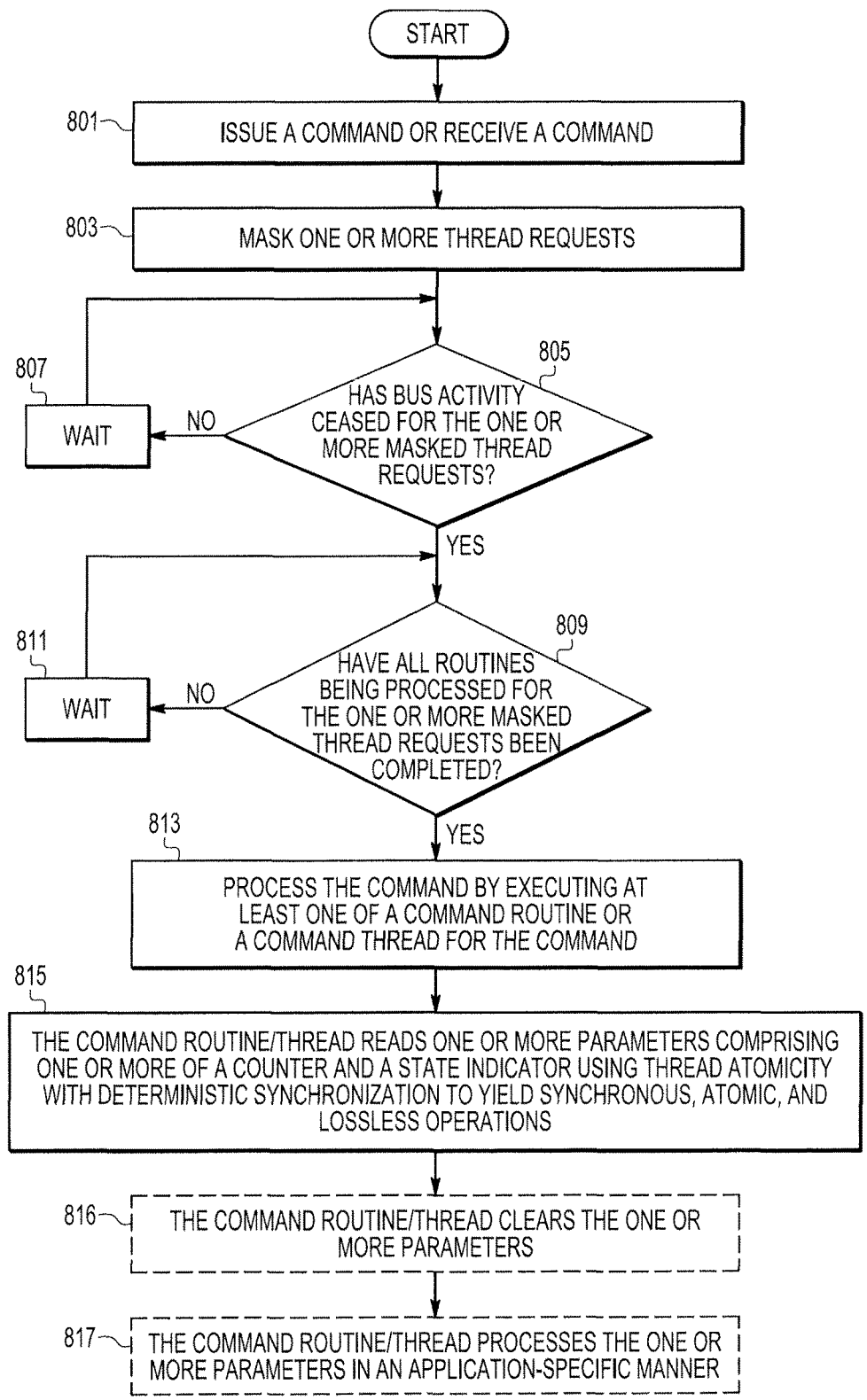
FIG. 8 is a flowchart showing a first illustrative operational sequence configured according to a set of exemplary embodiments for obtaining and processing counter values, state fields, and other parameters using thread atomicity with deterministic synchronization to provide synchronous, atomic and lossless operations.

FIG. 8 is a flowchart showing a first illustrative operational sequence configured according to a set of exemplary embodiments for obtaining and processing counter values, state fields, and other parameters using thread atomicity with deterministic synchronization to provide synchronous, atomic and lossless operations. The operational sequence commences at block 801 where a command is issued or received. Next, at block 803, one or more thread requests are masked. Program control progresses to block 805 where a test is performed to ascertain whether or not bus activity has ceased for the one or more masked thread requests. If not, the program waits at block 807 for a predetermined, preprogrammed, indication or specified period of time, and the test of block 805 is repeated. The affirmative branch from block 805 leads to block 809 where a test is performed to ascertain whether or not all routines being processed for the one or more masked threads have been completed. If not, the program waits at block 811 for a predetermined, preprogrammed, indication or specified period of time, and the test of block 809 is repeated.

The affirmative branch from block 809 leads to block 813 where the command is processed by executing a command routine and/or a command thread for the command. At block 815, the command routine/thread reads one or more parameters comprising one or more of a counter and a state indicator, using thread atomicity with deterministic synchronization to yield synchronous, atomic, and lossless operations. This step provides an application with an accurate and unambiguous snapshot of a processing environment.

In practice, the one or more parameters may be used to represent any of a variety of entities such as state indicators, counters, variables, or other values. Depending upon exactly what the one or more parameters are used to represent, and how the one or more parameters are used in a particular application, it may be necessary or desirable to clear the one or more parameters after they are read at block 815. Accordingly, the operational sequence of FIG. 8 may progress to one or more of optional block 816 and optional block 817. At block 816, the command routine/thread may clear the one or more parameters. At block 817, the command routine/thread may process the one or more parameters in an application-specific manner. If blocks 816 and 817 are both performed, these blocks can be performed contemporaneously or in any order.

According to at least some embodiments of the invention, the procedure of FIG. 8 uses hardware or software (or any combination thereof) that selects one or more threads for masking by continuously, periodically, or repeatedly monitoring thread activity for each of a plurality of threads. The hardware masks thread requests and activity in response to issuance or receipt of a command, thereby allowing a command routine/thread to be executed to read and/or clear the counter or state. The command may, but need not, mask multiple threads, allowing complex implementations (e.g., redundancy using 2 ports and therefore 4 threads) to sample states/counters in an unambiguous manner. For example, a redundancy protocol may be executed while masking the one or more thread requests, and a set of two or more unambiguous samples of the at least one state or counter may be obtained. After issuing the command, this hardware masks the threads requests, waits for bus activity to cease on the threads, and waits for a RISC/CPU to finish any routine currently being processed for the threads. The command is then passed to the RISC or hardware for processing.

According to at least some embodiments of the invention, the procedure of FIG. 8 uses a dedicated thread for the RISC complex 612 (FIG. 6) or the CPU 602 that executes the command and reads and/or updates states and counters. The hardware may be programmed to only execute the command if the threads targeted by the command are not being handled by the RISC complex 612 or the CPU 602. The hardware may be programmed to only execute the command if there are no pending external bus 603 accesses attributed to the threads targeted by the command. After allowing for a subsequent execution of the command, such that the hardware will mask the thread requests while the thread command routine is being processed or enabled [command enable=1] by the RISC and the corresponding thread mask bits are set in the thread array registers 631, the hardware may be programmed to mask the thread requests until the command completes.

According to at least some embodiments of the invention, the procedure of FIG. 8 uses a first register for issuing the command to the RISC complex 612 (FIG. 6) or CPU 602, and at least a second register and a third register for identifying or determining which threads are attributed to the command. For example, the command register 617 (FIGS. 6 and 7) may be used for issuing the command to the RISC complex 612 or CPU 602, and the set of thread array registers 631 may be used for identifying one or more threads that are attributed to the command. The hardware may be programmed to generate a completion notification when the command has been executed.

Figure 9:
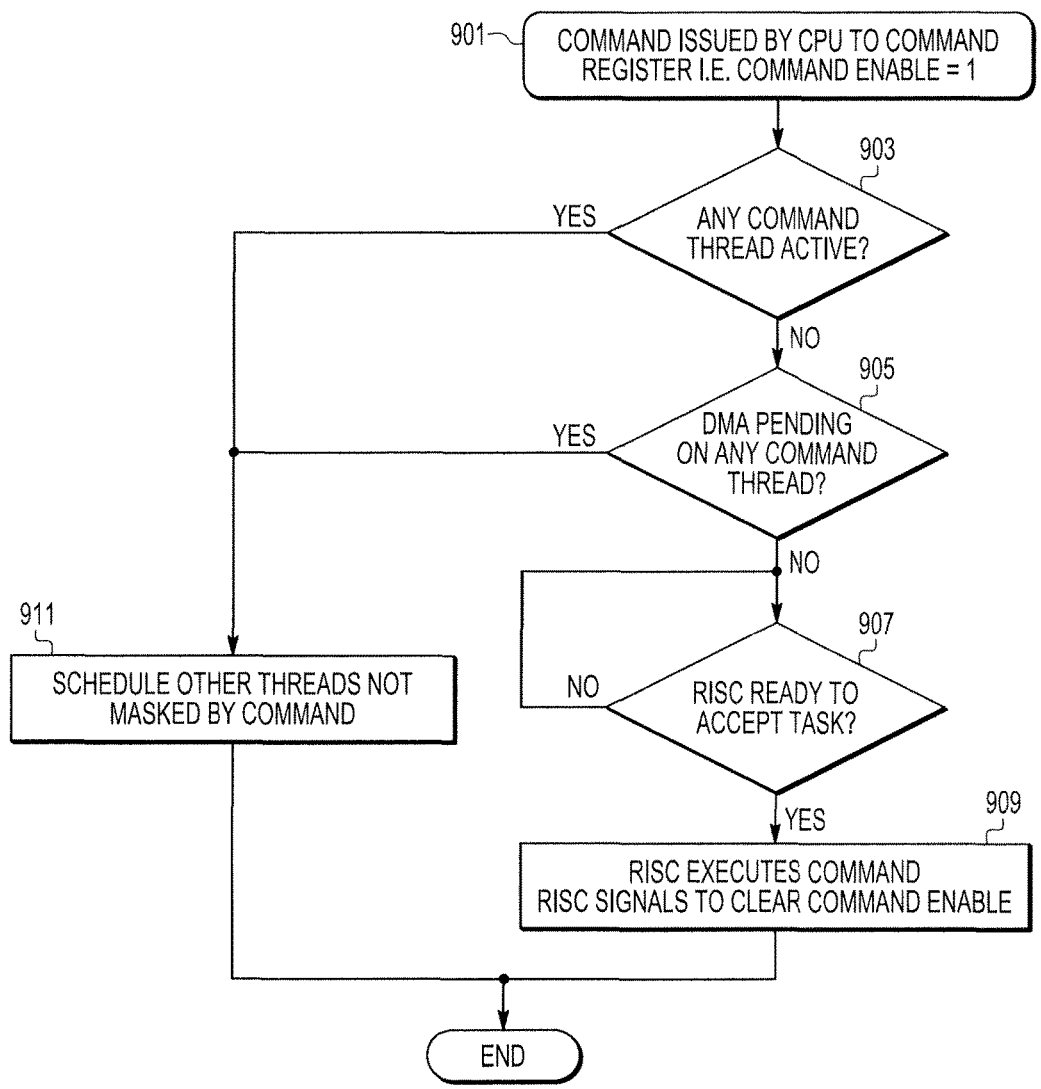
FIG. 9 is a flowchart showing a second illustrative operational sequence configured according to a set of exemplary embodiments for obtaining and processing counter values, state fields, and other parameters using thread atomicity with deterministic synchronization to provide synchronous, atomic and lossless operations.

FIG. 9 is a flowchart showing a second illustrative operational sequence configured according to a set of exemplary embodiments for obtaining and processing counter values, state fields, and other parameters using thread atomicity with deterministic synchronization to provide synchronous, atomic and lossless operations. The operational sequence of FIG. 9 commences at block 901 where a command is issued by the CPU 602 (FIG. 6) to the command register 617, thereby setting a command enable parameter to a value of 1. Next, at block 903 (FIG. 9), a test is performed to ascertain whether or not any command thread is presently active. If so, other threads that are not masked by the command are scheduled (block 911).

The negative branch from block 903 leads to block 905 where a test is performed to ascertain whether or not there is a Direct Memory Access (DMA) pending on any command thread. If so, other threads that are not masked by the command are scheduled (block 911). The negative branch from block 905 leads to block 907 where a test is performed to ascertain whether or not the RISC complex 612 (FIG. 6)

is ready to accept a task. If not, the program loops back to block 907 (FIG. 9) until the RISC complex 612 (FIG. 6) is ready to accept the task. The affirmative branch from block 907 (FIG. 9) leads to block 909 where the RISC complex 612 (FIG. 6) executes the command. The RISC complex 612 provides a signal to clear the command enable parameter so that the value of the command enable parameter is now set to zero.

The procedure of FIG. 9 is configured to obtain counter values, state fields, and other parameters using thread atomicity with deterministic synchronization to provide synchronous, atomic and lossless operations. The procedure provides this functionality by allowing an application to issue a command, or receiving a command from an application. The command will not be processed until all the threads attributed to or related to the command are not being processed. Processing of the command occurs only in response to any threads related to or attributed to the command not being currently processed. From time to time, such threads may be processed, for example, by an offload processor. After the command thread begins to be processed, the invention will not allow other threads to be processed until the command completes. The command can thus read multiple states/counters and other parameters synchronously, thereby providing the application with an accurate unambiguous snapshot of a system or processing environment.

Figure 10:
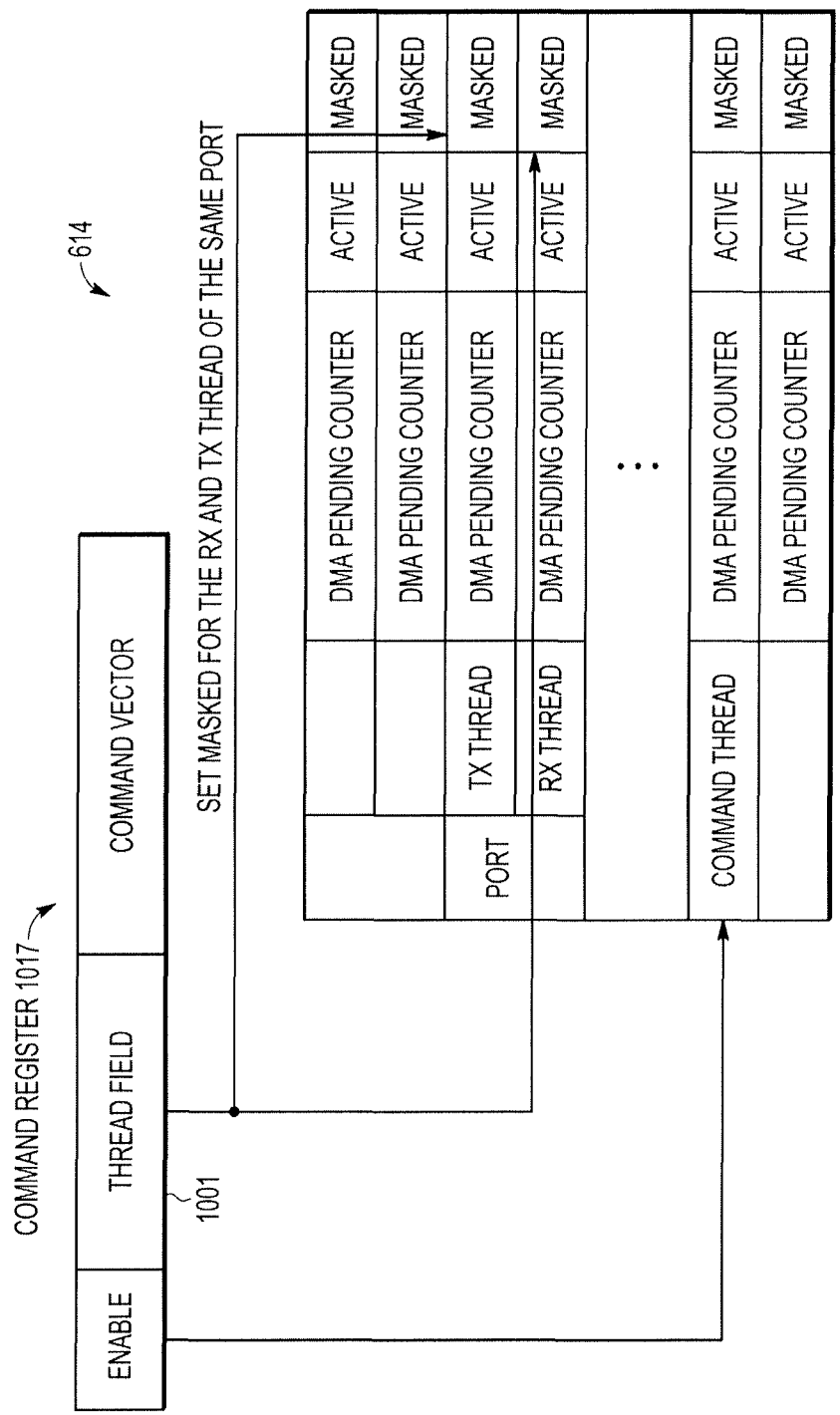
FIG. 10 is a data structure diagram illustrating a prior art technique for masking a transmit thread and a receive thread of the same port.

FIG. 10 is a data structure diagram showing a prior art technique for masking a transmit thread and a receive thread of the same port. A thread field 1001 in a command register 1017 in this example merely targets one port. The scheduler 614 (FIGS. 6, 7, and 10) may be implemented using hardware, software, or firmware, or any combination of hardware, software, and firmware. A software implementation may, but need not, be used in connection with Linux. The scheduler 614 is configured to interface with one or more ports. The approach shown in FIG. 10 only guarantees that a particular port's threads are not being processed. However, this approach does not allow for system-wide parameter reading when multiple threads and/or RISCs are operating concurrently. Likewise, this approach does not allow multiple ports to participate in the same command coherently. For example, a simple redundancy scheme where two ports transmit the same data would benefit from having a coherent command that allows guaranteed accurate comparison of data/states on both ports. The commands currently supported are for stopping and starting ports/links, and not for sampling states/counters in a complex system/application-wide manner involving a plurality of threads and ports.

Figure 11:
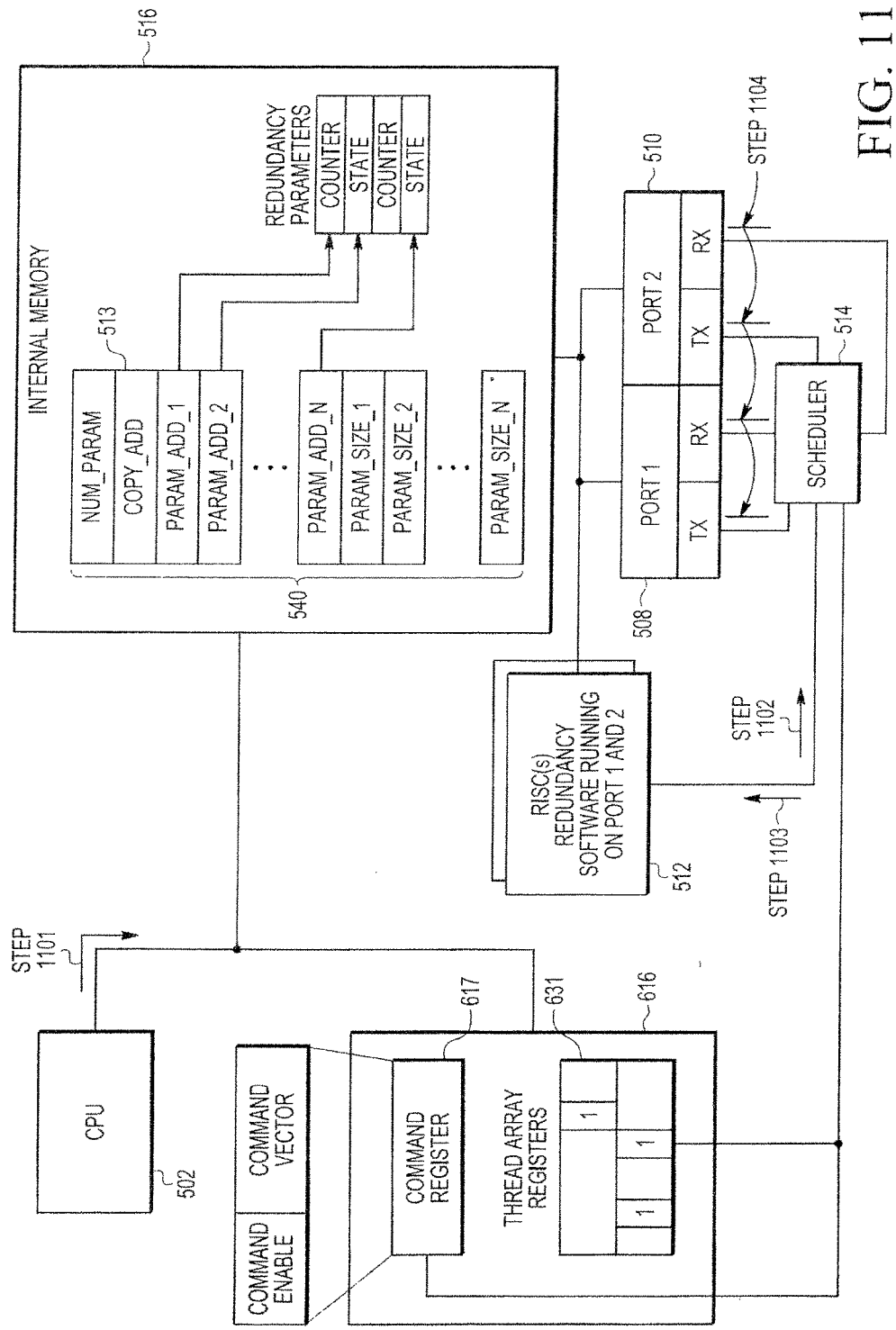
FIG. 11 is a hardware block diagram showing an illustrative apparatus configured according to a set of exemplary embodiments for obtaining and processing counter values, state fields, and other parameters using thread atomicity with deterministic synchronization to provide synchronous, atomic and lossless operations.
Figure 16:
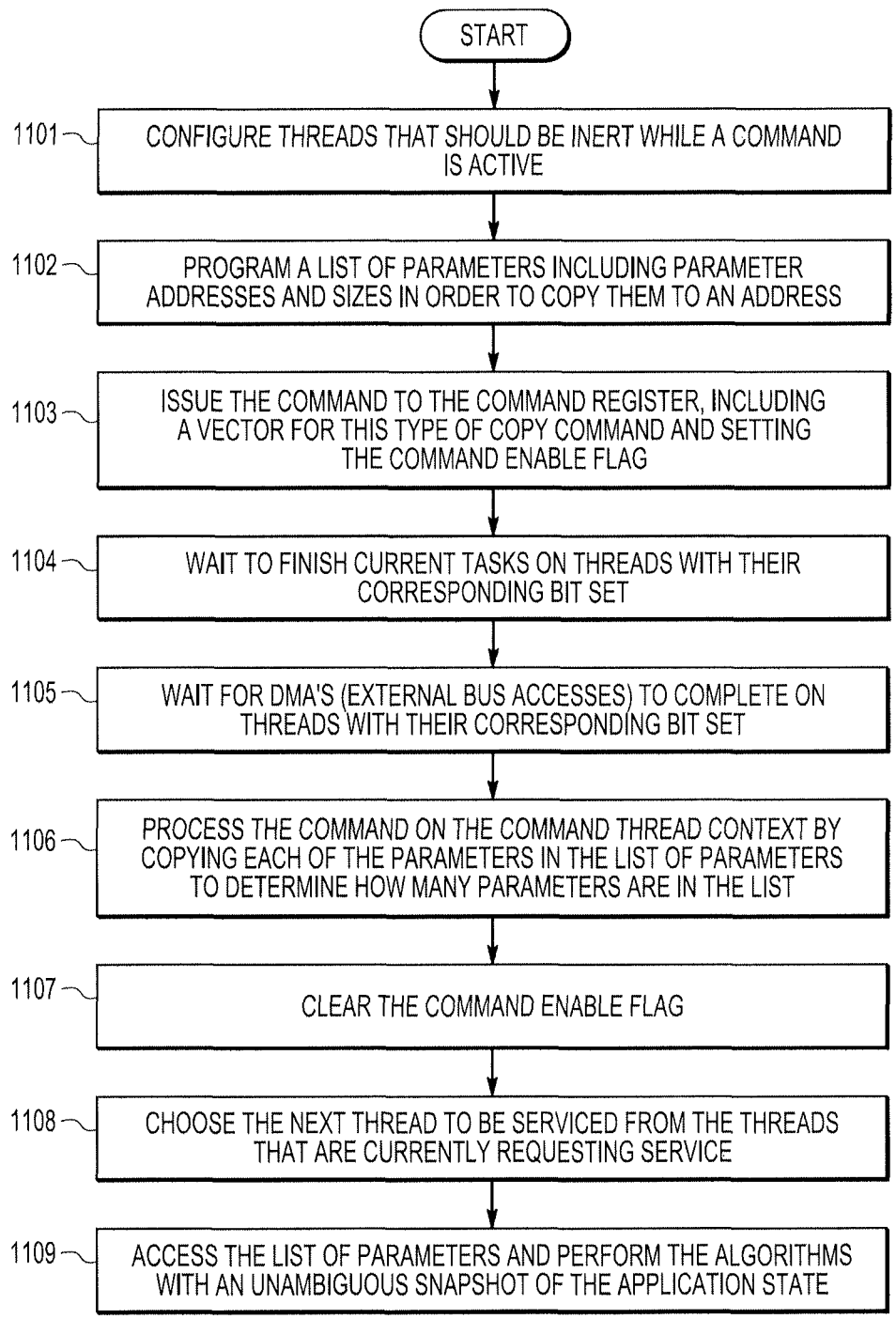
FIG. 16 is a flowchart showing an illustrative operational sequence for obtaining counter values, state fields, and other parameters using the apparatus of FIG. 11 according to a set of exemplary embodiments.

FIG. 11 is a hardware block diagram showing an illustrative apparatus configured according to a set of exemplary embodiments for obtaining and processing counter values, state fields, and other parameters using thread atomicity with deterministic synchronization to provide synchronous, atomic and lossless operations. FIG. 16 is a flowchart showing an illustrative operational sequence for obtaining counter values, state fields, and other parameters using the apparatus of FIG. 11 according to a set of exemplary embodiments. With reference to FIG. 16, step 1101 configures threads that should be inert while a command is active. The CPU 502 (FIG. 11) configures which threads should be inert while a command is active. For example, referring now to FIG. 11, the CPU 502 may accomplish the function of block 1101 (FIG. 16) by programming the thread array registers 631.

Next, at step 1102 (FIG. 16), a list of parameters including parameter addresses and sizes are programmed in order to copy them to an address. For example, the CPU 502 (FIG. 11) may program a list of parameters 540 including parameter addresses and sizes in order for the RISCs 512 to copy them to an address Copy_Add 513. The operational sequence then progresses to step 1103 (FIG. 16) where the command is issued to the command register, including a vector for this type of copy command, and the command enable flag is set. For example, the CPU 502 (FIG. 11) may issue the command to the command register 617, including a vector for this type of copy command and setting the command enable flag to a value of 1.

The operational sequence of FIG. 16 waits at step 1104 to finish current tasks on threads with their corresponding bit set. For example, the scheduler 514 (FIG. 11) may wait for the RISCs 512 to finish any current tasks on threads with their corresponding bit set in the thread array registers 631. The operational sequence of FIG. 16 waits at step 1105 for DMAs (external bus accesses) to complete on threads with their corresponding bit set. For example, the scheduler 514 (FIG. 11) may wait for DMAs to complete on threads with their corresponding bit set in the thread array registers 631.

Next, at step 1106 (FIG. 16), the command is processed on the command thread context by copying each of the parameters in the list of parameters to determine how many parameters are in the list. For example, the RISCs 512 (FIG. 11) may start processing the command on the command thread context. The RISCs 512 may copy each of the parameters in the list of parameters 540 using the Numparams field to determine how many parameters are in the list. The operational sequence of FIG. 16 then progresses to step 1107 where the command enable flag is cleared. For example, the RISCs 512 (FIG. 11) may clear the command enable flag, setting the value of the command enable flag to zero. After copying, the RISCs 512 are free to clear, update, and perform calculations on the parameters addresses from which the data was copied.

Then, at step 1108 (FIG. 16), the next thread to be serviced is chosen from the threads that are currently requesting service. For example, the scheduler 514 (FIG. 11) may choose the next thread to be serviced from all of the threads that are currently requesting service. Next, at step 1109 (FIG. 16), the list of parameters is accessed and the algorithms are performed with an unambiguous snapshot of the application state. For example, the CPU 502 (FIG. 11) may access the list of parameters 540 and perform their algorithms with an unambiguous snapshot of the application state.

According to at least some embodiments of the invention, a generic mechanism of operating system (O/S) threads may be connected or operatively coupled to a thread activity monitor. Likewise, according to at least some embodiments of the invention, it may be anticipated that there will be more threads than CPUs, such that the operational sequences of FIGS. 8, 9, and 16 will perform well.

According to at least some embodiments of the invention, the command completion may constitute an interrupt or some metadata written to a location.

According to a set of alternate embodiments of the invention, the CPU threads may be connected to or directly coupled to the scheduler.

According to a set of further embodiments of the invention, any of the procedures of FIG. 8, 9, or 16 may be utilized in conjunction with multiple threads operating on the same CPU.

According to at least some embodiments of the invention, the address for the host command to copy data to may be in internal memory that the RISC complex can access, such the data is available immediately after the command complete (command enable cleared by the RISC complex).

Figure 12:
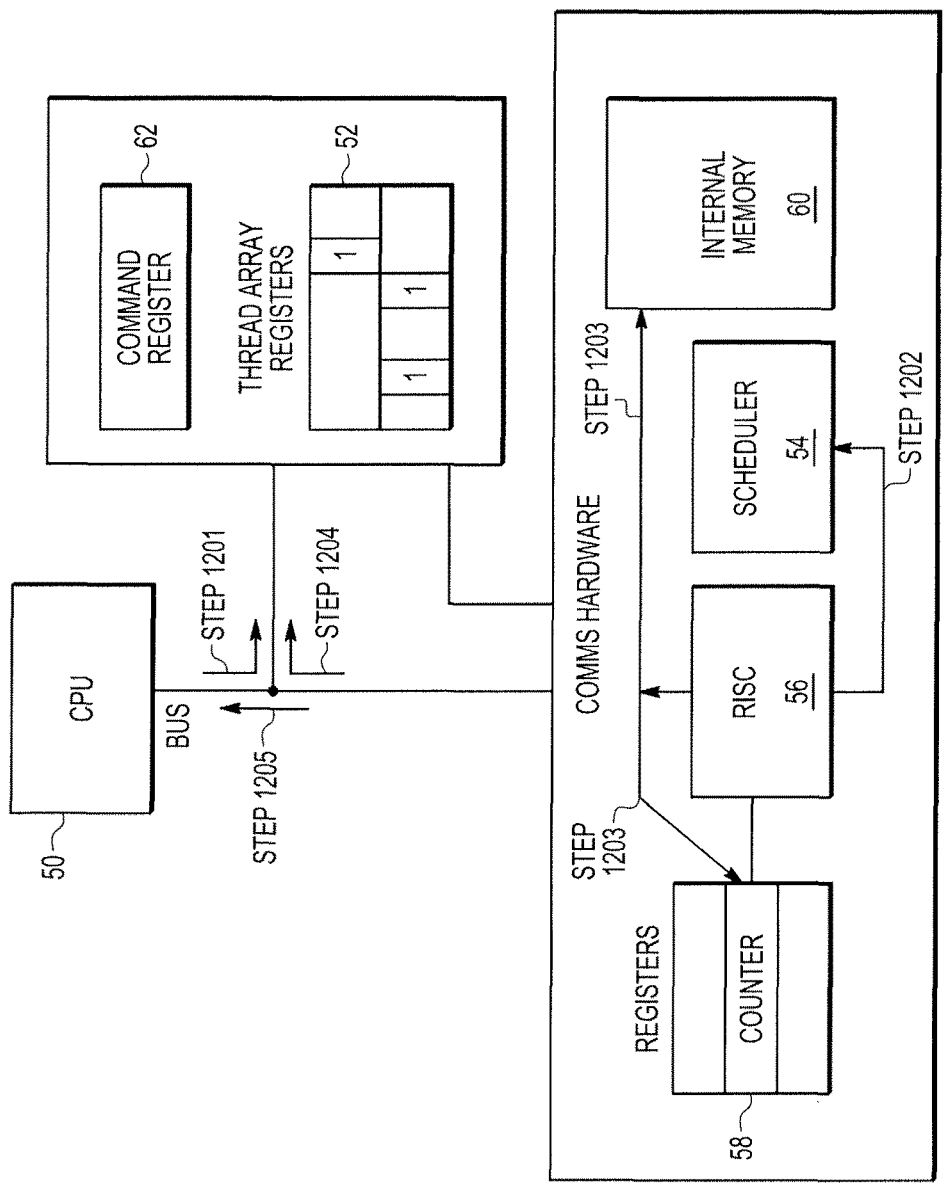
FIG. 12 is a hardware block diagram showing an illustrative apparatus configured according to a set of exemplary embodiments for reading and clearing counter values using thread atomicity with deterministic synchronization to provide synchronous, atomic and lossless operations.
Figure 17:
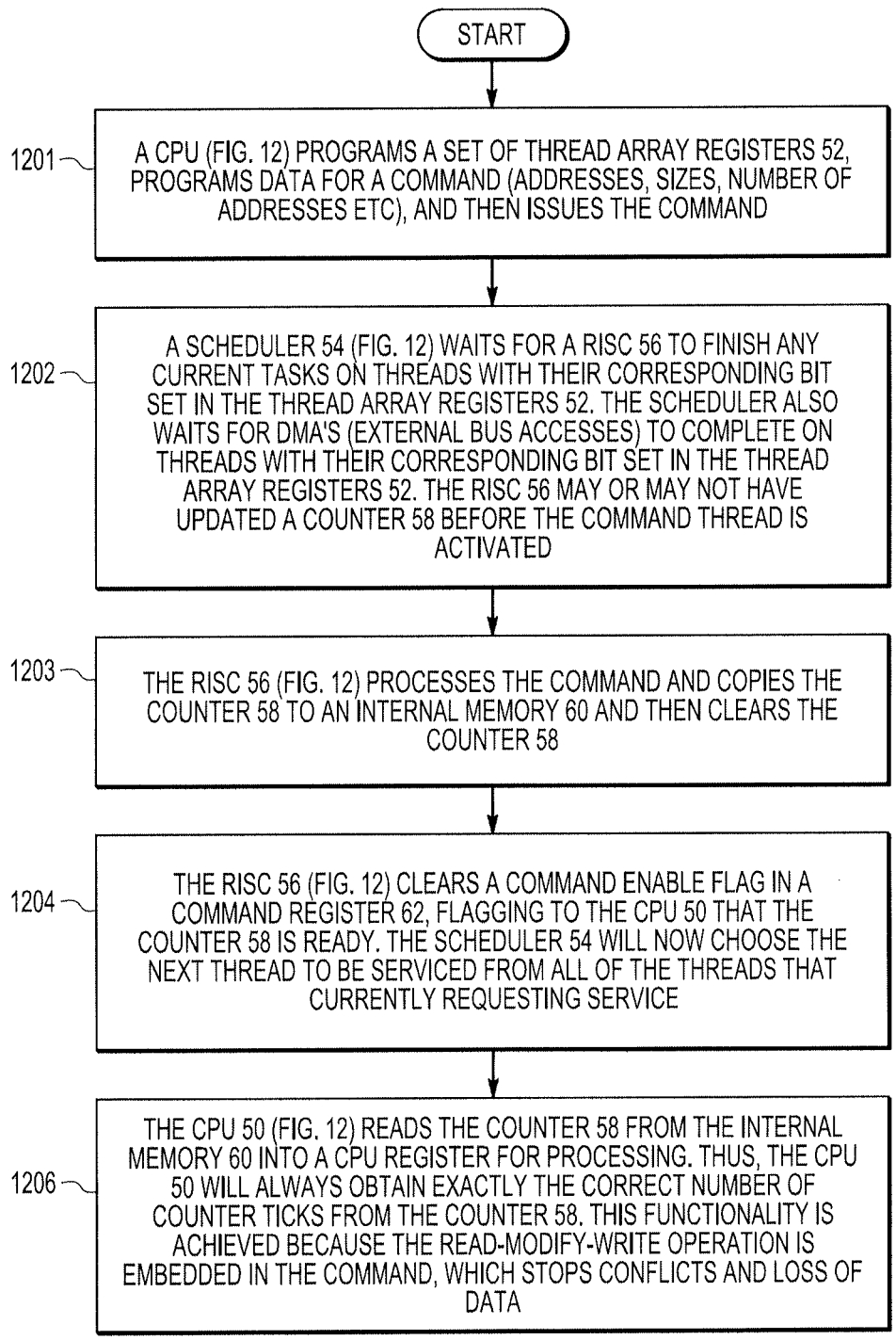
FIG. 17 is a flowchart showing an illustrative operational sequence for reading and clearing counter values using the apparatus of FIG. 12 according to a set of exemplary embodiments.

FIG. 12 is a hardware block diagram showing an illustrative apparatus configured according to a set of exemplary embodiments for reading and clearing counter values using thread atomicity with deterministic synchronization to provide synchronous, atomic and lossless operations. FIG. 17 is a flowchart showing an illustrative operational sequence for reading and clearing counter values using the apparatus of FIG. 12 according to a set of exemplary embodiments. With reference to FIGS. 12 and 17, at step 1201 (FIG. 17), a CPU 50 (FIG. 12) programs a set of thread array registers 52, programs data for a command (addresses, sizes, number of addresses etc), and then issues the command. At step 1202 (FIG. 17), a scheduler 54 (FIG. 12) waits for a RISC 56 to finish any current tasks on threads with their corresponding bit set in the thread array registers 52. The scheduler also waits for DMAs (external bus accesses) to complete on threads with their corresponding bit set in the thread array registers 52. The RISC 56 may or may not have updated a counter 58 before the command thread is activated.

At step 1203 (FIG. 17), the RISC 56 (FIG. 12) processes the command and copies the counter 58 to an internal memory 60 and then clears the counter 58. Next, at step 1204 (FIG. 17), the RISC 56 (FIG. 12) clears a command enable flag in a command register 62, flagging to the CPU 50 that the counter 58 is ready. The scheduler 54 will now choose the next thread to be serviced from all of the threads that are currently requesting service. For example, it may be that the counter 58 is updated in the next routine to be executed by the RISC 56. At step 1205 (FIG. 17), the CPU 50 (FIG. 12) reads the counter 58 from the internal memory 60 into a CPU register for processing. Thus, the CPU 50 will always obtain exactly the correct number of counter ticks from the counter 58. This functionality is achieved because the read-modify-write operation required by the CPU 50 is embedded in the routines of the command thread, which stops conflicts, ambiguity and loss of data.

Figure 13:
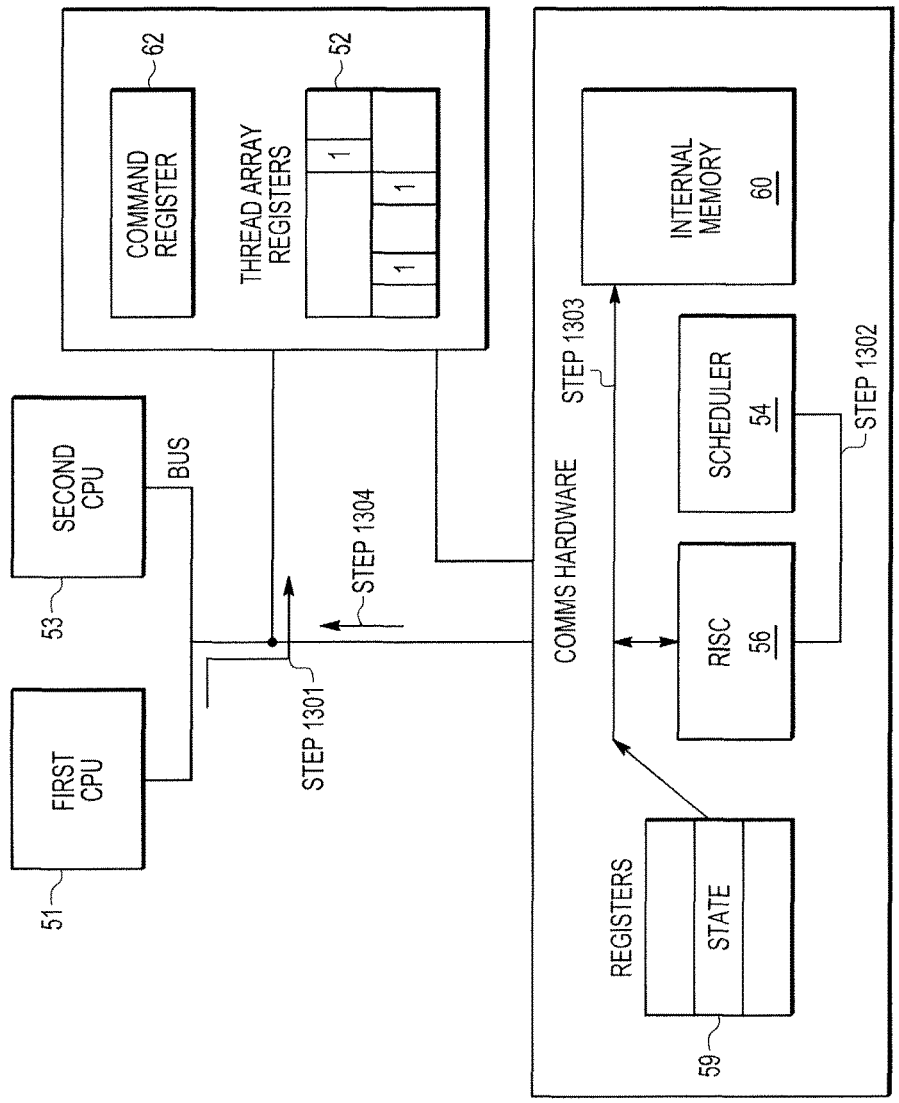
FIG. 13 is a hardware block diagram showing an illustrative apparatus configured according to a set of exemplary embodiments for reading states using thread atomicity with deterministic synchronization to provide synchronous, atomic and lossless operations.
Figure 18:
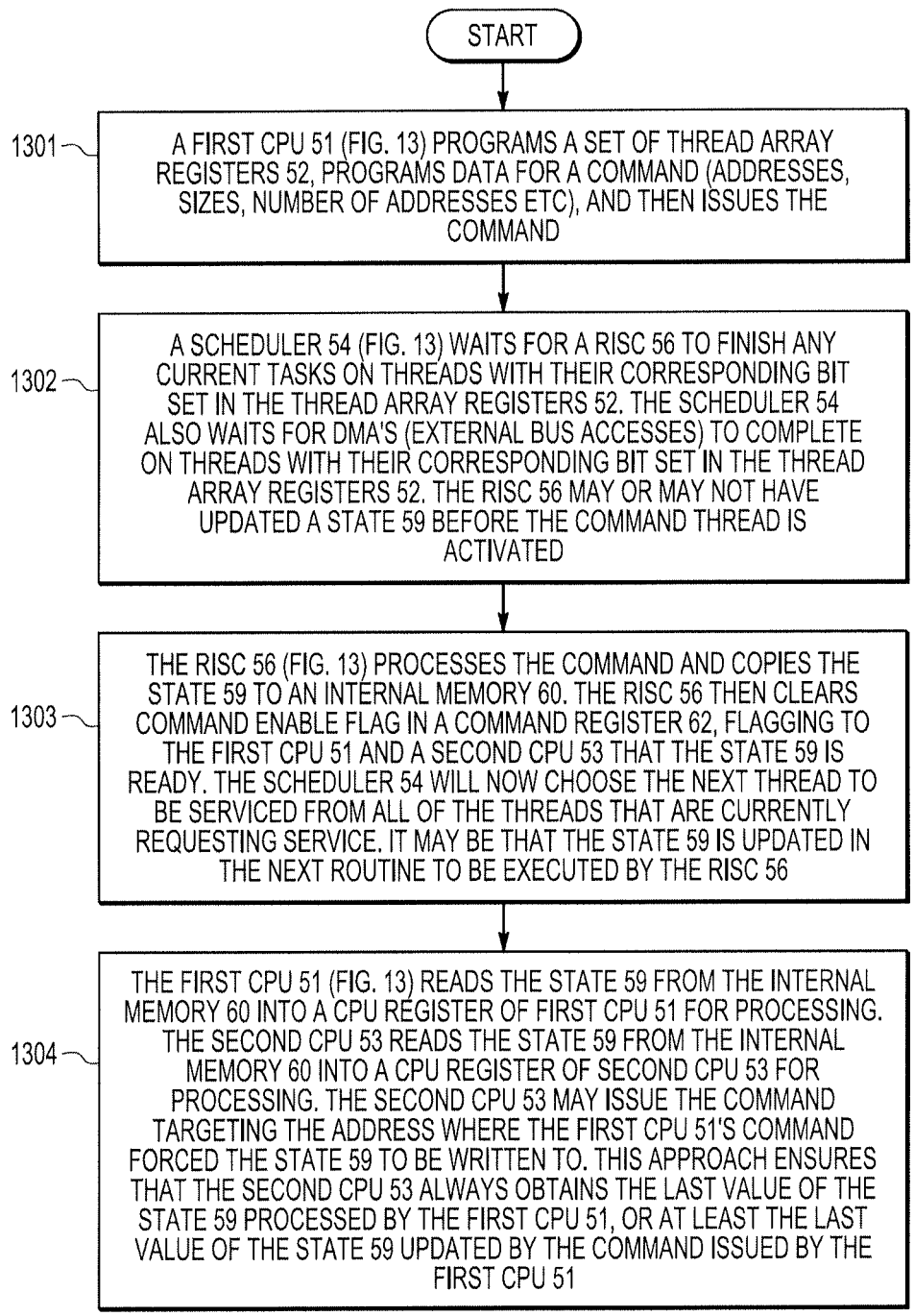
FIG. 18 is a flowchart showing an illustrative operational sequence for reading states using the apparatus of FIG. 13 according to a set of exemplary embodiments.

FIG. 13 is a hardware block diagram showing an illustrative apparatus configured according to a set of exemplary embodiments for reading states using thread atomicity with deterministic synchronization to provide synchronous, atomic and lossless operations. FIG. 18 is a flowchart showing an illustrative operational sequence for reading states using the apparatus of FIG. 13 according to a set of exemplary embodiments. With reference to FIGS. 13 and 18, at step 1301 (FIG. 18), a first CPU 51 (FIG. 13) programs a set of thread array registers 52, programs data for a command (addresses, sizes, number of addresses etc), and then issues the command to command register 62 (FIG. 13). Next, at step 1302 (FIG. 18), a scheduler 54 (FIG. 13) waits for a RISC 56 to finish any current tasks on threads with their corresponding bit set in the thread array registers 52. The scheduler 54 also waits for DMAs (external bus accesses) to complete on threads with their corresponding bit set in the thread array registers 52. The RISC 56 may or may not have updated a state 59 before the command thread is activated.

At step 1303 (FIG. 18), the RISC 56 (FIG. 13) processes the command and copies the state 59 to an internal memory 60. The RISC 56 then clears command enable flag in a command register 62, flagging to the first CPU 51 and a second CPU 53 that the state 59 is ready. The scheduler 54 will now choose the next thread to be serviced from all of the threads that are currently requesting service. It may be that the state 59 is updated in the next routine to be executed by the RISC 56. Next, at step 1304 (FIG. 18), the first CPU 51 (FIG. 13) reads the state 59 from the internal memory 60 into a CPU register of first CPU 51 for processing. The second CPU 53 reads the state 59 from the internal memory 60 into a CPU register of second CPU 53 for processing. The second CPU 53 may issue the command targeting the address where the first CPU 51's command forced the state 59 to be written to. This approach ensures that the second CPU 53 always obtains the last value of the state 59 processed by the first CPU 51, or at least the last value of the state 59 updated by the command issued by the first CPU 51.

The procedure of FIG. 18 enables both the first CPU 51 and the second CPU 53 to obtain access to the same state 59. This functionality may be required in order to properly execute certain applications. Although the example of FIGS. 13 and 18 uses one state 59, if multiple states are read concurrently at different locations within the internal memory 60 (FIG. 13) and the command writes them all to a known location within the internal memory 60, then this scheme provides an accurate unambiguous snapshot of the system-wide state. Note that the cascading of commands is used herein to ensure that the first CPU 51 command is not updating the location where the state 59 or states are written while the second CPU 53 is reading this location.

The first and second CPUs 51, 53 may, but need not, synchronize on the command enable flag. For example, while this flag is set, neither the first CPU 51 nor the second CPU 53 may issue a new command. In addition, the first and second CPUs 51, 53 may be configured to signal to each other whether or not a command has been issued and, if so, how many commands have been issued. For example, if the first and/or second CPU 51, 53 increments a counter each time the first and/or second CPU 51, 53 needs to access the state 59, any of the CPUs can use this information to compare which CPU should issue the command. For example, the CPU with the highest value counter may issue the command. The first and second CPUs 51, 53 may use a mutex to ensure coherency when updating the command register 62.

Figure 14:
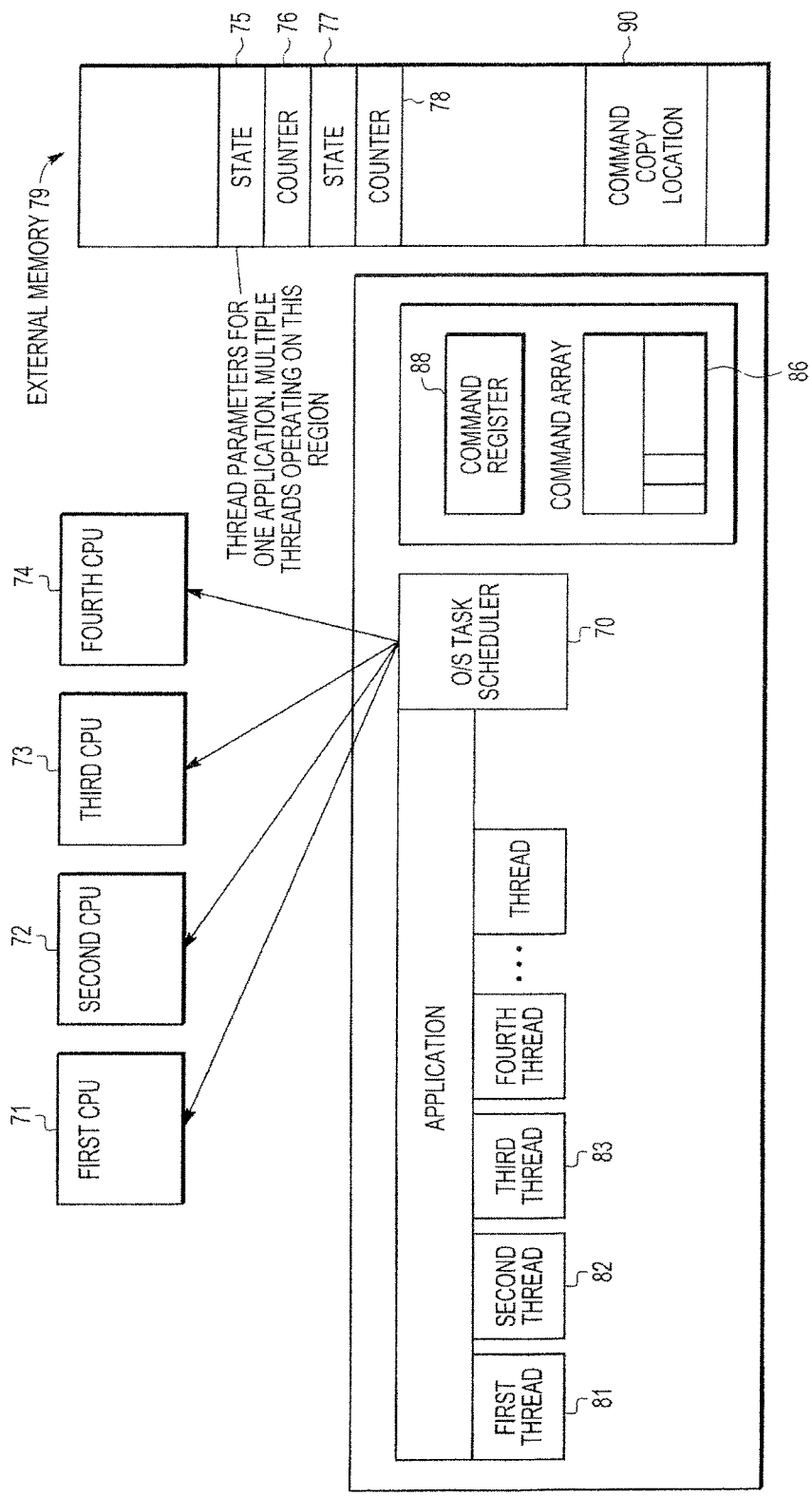
FIG. 14 is an architectural data flow diagram of a software implementation configured for running on an operating system with task/thread scheduling according to a set of exemplary embodiments.

FIG. 14 is an architectural data flow diagram of a software implementation configured for running on an operating system (O/S) with task/thread scheduling according to a set of exemplary embodiments. An O/S task scheduler 70 assigns a first application thread 81 to a first CPU 71. The O/S task scheduler 70 assigns a second application thread 82 to a second CPU 72. Similarly, the O/S task scheduler 70 assigns a third application thread 83 to a third CPU 73. The second application thread 82 updates one or more states 75, 77 and one or more counters 76, 78 in an external memory 79.

Assume that the third application thread 83 requires a synchronous read of the application parameters. The third application thread 83 programs a command array 86 with threads that are relevant for this command, or this programming could be performed by an O/S routine wherein the third application thread 83 signals to the O/S routine which command the third application thread 83 needs to perform. The third application thread 83 issues the command by writing to a command parameter 88 field. O/S task scheduling waits for threads that are relevant for the command to finish and return control back to the O/S. For example, assume that the first application thread 81 is required to cease while the command is in progress. This could be accomplished by a while loop when the command is active. The while loop will not allow the threads to write to the parameters that are relevant for a command. The first application thread 81 ceases it operation, freeing up core 1 of the first CPU 71, but before doing so, the first application thread 81 updates a state 75, 77 field.

A command thread for the command is activated on the fourth CPU 74 by the O/S task scheduler 70, which also ensures that the first application thread 81 is not invoked again or allowed to proceed until the command thread finishes. The command thread copies the parameters in this command to a command copy location 90 issued with the command. The command thread finishes its operation and returns control to the O/S task scheduler 70. The O/S can again invoke the first application thread 81 or choose any other threads to run on any of the first, second, third, or fourth CPUs 71, 72, 73, or 74. All application threads including the first, second, and third application threads 81, 82, and 83 may now access the command copy location 90 and work on the snapshot of states/counters/parameters synchronously sampled by the command.

Figure 15:
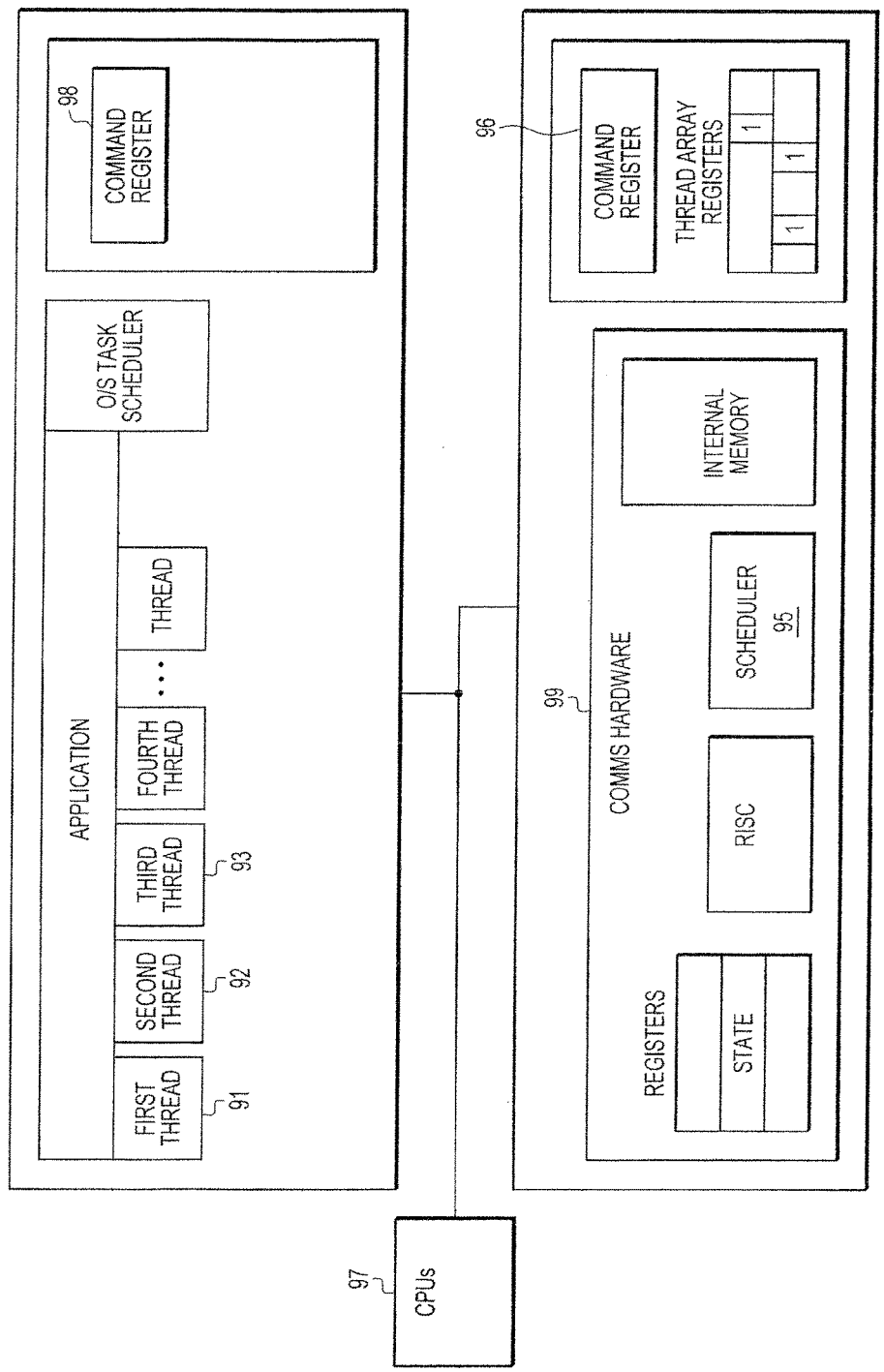
FIG. 15 is an architectural data flow diagram of a hybrid software-hardware implementation configured for running on an operating system with task/thread scheduling according to a set of exemplary embodiments.

FIG. 15 is an architectural data flow diagram of a hybrid software-hardware implementation configured for running on an operating system (O/S) with task/thread scheduling according to a set of exemplary embodiments. After a software thread 91 issues a command to a command parameter 98 field, the O/S will wait for one or more other software threads 92, 93 to cease that are relevant for the command. The command thread will then be triggered which will also write a command to a command register 96. The command thread will execute a routine for gathering and copying its parameters, and the command thread will also wait for a command enable flag to be cleared. Accordingly, the hybrid software-hardware implementation of FIG. 15 provides a heterogeneous snapshot of a system-wide state across multiple indirectly connected software domains and parameter regions within a system. According to a set of alternate embodiments, it is possible to have thread context information from one or more CPUs 97, and/or an O/S feeding directly into a hardware scheduler 95 provided by a communications (comms) hardware 99 device. Illustratively, the comms hardware device 99 may be implemented as an integrated circuit or silicon chip.

Although the foregoing discussion describes exemplary embodiments of apparatuses and related methods of operation associated therewith, the present disclosure is intended to encompass numerous other embodiments as well. It should also be appreciated that the many apparatuses, systems, circuits, and methods of operation described above in detail or otherwise encompassed by the present disclosure can be implemented in numerous contexts, in integrated circuits or other circuits or components or systems. For example, in at least some embodiments, the apparatuses, systems, circuits, and methods of operation described herein or otherwise encompassed herein can be used in networking systems, automotive applications, and other applications.

While the principles of the invention have been described above in connection with specific apparatuses, it is to be clearly understood that this description is made only by way of example and not as a limitation on the scope of the invention. It is specifically intended that the present invention not be limited to the embodiments and illustrations contained herein, but include modified forms of those embodiments including portions of the embodiments and combinations of elements of different embodiments as come within the scope of the following claims.

What is claimed is:

1. A method comprising:
   masking one or more thread requests;
   executing at least one of a command routine or a command thread for a command in response to both ascertaining that a ceasing of all bus activity for the one or more masked thread requests has occurred, and additionally ascertaining that a completion of all routines being processed for the one or more masked thread requests has occurred, wherein
   the command routine or the command thread reads a plurality of parameters using thread atomicity with deterministic synchronization, and
   the plurality of parameters comprises one or more of a counter and a state indicator.

2. The method of claim 1 further comprising selecting the one or more thread requests for masking by monitoring thread activity for each of a plurality of threads.

3. The method of claim 1, further comprising:
   obtaining a set of one or more samples of the at least one state or counter, wherein after sampling a first parameter of the plurality of parameters, a subsequent sampling of a second parameter of the plurality of parameters is performed without any thread changing any of the plurality of parameters.

4. The method of claim 1 further comprising processing the command using a reduced instruction set computer (RISC) configured with a dedicated command thread for executing the command.

5. The method of claim 4 further comprising using a first register for issuing the command to the RISC, and using a second register for identifying one or more threads that are attributed to the command.

6. The method of claim 1 further comprising generating a completion notification.

7. The method of claim 1 further comprising transmitting the plurality of parameters to an application to provide the application with at least one of an unambiguous counter reading or an unambiguous state indication.

8. An apparatus configured to perform parameter sampling in a heterogeneous multi-core or multi-threaded environment, the apparatus comprising:
   a processing mechanism including a central processing unit (CPU) and a RISC complex, wherein the processing mechanism is configured for masking one or more thread requests; and
   a scheduler, operatively coupled to the CPU of the processing mechanism by a bus, wherein
   the processing mechanism is configured for executing a command in response to the scheduler determining both that a ceasing of activity on the bus for the one or more masked thread requests has occurred, and that a completion of all routines being processed for the one or more masked thread requests has occurred,
   the processing mechanism is configured to execute at least one of a command routine or a command thread for the command,
   the command routine or the command thread reads a plurality of parameters using thread atomicity with deterministic synchronization, and
   the plurality of parameters comprises one or more of a counter and a state indicator.

9. The apparatus of claim 8 wherein the scheduler is configured to select one or more thread requests for masking by monitoring thread activity for each of a plurality of threads.

10. The apparatus of claim 8 wherein the processing mechanism is further configured to perform masking by masking a plurality of thread requests while executing a redundancy protocol, such that at least one state or counter is sampled in an unambiguous manner.

11. The apparatus of claim 8 wherein the processing mechanism is further configured to process the command using a dedicated command thread that executes the command and reads at least one state or counter.

12. The apparatus of claim 8 further comprising a first register, operatively coupled to the processing mechanism, for issuing the command to the processing mechanism.

13. The apparatus of claim 12, further comprising at least a second register and a third register, for identifying one or more threads that are attributed to the command.

14. The apparatus of claim 8 wherein the processing mechanism is further configured to generate a completion notification in response to the command being executed.

15. The apparatus of claim 8 wherein the processing mechanism is further configured to transmit the plurality of parameters to an application to provide the application with at least one of an unambiguous counter reading or an unambiguous state indication.

16. The apparatus of claim 8 wherein the apparatus is provided in the form of one or more integrated circuits.

17. A system configured to perform parameter sampling in a heterogeneous multi-core or multi-threaded environment, the system comprising:
   a central processing unit (CPU);
   a RISC complex;
   a scheduler; and
   a bus, operatively coupled to the scheduler;
   wherein the scheduler is configured for executing a command only in response to any threads related to or attributed to the command not being currently executed;
      upon commencement of executing the command, the scheduler being configured to use thread atomicity with deterministic synchronization to not allow any threads other than a command thread to be processed until the command completes; wherein the command is configured for reading one or more of a counter and a state indicator.

18. The system of claim 17 wherein the synchronously read plurality of states or the synchronously read plurality of counters are provided to an application.

19. The system of claim 17 further comprising:
   a processor operatively coupled to the scheduler;
   wherein the processor is configured for processing the command in response to the scheduler determining both: (a) activity on the bus ceasing for the one or more masked thread requests, and (b) completion of all routines being processed for the one or more masked threads;
   wherein the processor is configured to process the command by executing at least one of a command routine or the command thread for the command;
   wherein the command routine or the command thread synchronously reads a plurality of parameters comprising one or more of a counter and a state indicator;
   wherein the processor is further configured for receiving a command, and for masking one or more thread requests.

20. The system of claim 19 wherein the processor is further configured to provide the synchronously read plurality of states or the synchronously read plurality of counters to an application.

* * * * *